(12) United States Patent
Brown et al.

(10) Patent No.: US 8,620,850 B2
(45) Date of Patent: Dec. 31, 2013

(54) DYNAMICALLY MANIPULATING AN EMOTICON OR AVATAR

(75) Inventors: Robert William Brown, Arnprior (CA); Michael Hin Kai Hung, Toronto (CA); Rebecca Lynne Young, Waterloo (CA)

(73) Assignee: BlackBerry Limited, Waterloo (CA)

( * ) Notice: Subject to any disclaimer, the term of this patent is extended or adjusted under 35 U.S.C. 154(b) by 567 days.

(21) Appl. No.: 12/876,580

(22) Filed: Sep. 7, 2010

(65) Prior Publication Data
US 2012/0059787 A1 Mar. 8, 2012

(51) Int. Cl.
*G06N 7/02* (2006.01)
*G06N 7/06* (2006.01)

(52) U.S. Cl.
USPC .............................. 706/52; 463/31; 715/764

(58) Field of Classification Search
USPC .......................................................... 706/52
See application file for complete search history.

(56) References Cited

U.S. PATENT DOCUMENTS

| | | | |
|---|---|---|---|
| 5,347,306 A | 9/1994 | Nitta et al. | |
| 6,404,438 B1 | 6/2002 | Hatlelid et al. | |
| 6,476,830 B1 | 11/2002 | Farmer et al. | |
| 2004/0001090 A1 | 1/2004 | Brown et al. | |
| 2004/0162877 A1 | 8/2004 | Van Dok et al. | |
| 2004/0179037 A1 | 9/2004 | Blattner et al. | |
| 2005/0223328 A1 | 10/2005 | Ashtekar et al. | |
| 2006/0015812 A1 | 1/2006 | Cunningham et al. | |
| 2008/0221892 A1 | 9/2008 | Nathan et al. | |
| 2009/0055484 A1 | 2/2009 | Vuong et al. | |
| 2009/0147008 A1 | 6/2009 | Do et al. | |
| 2009/0177976 A1 | 7/2009 | Bokor et al. | |
| 2009/0309891 A1 | 12/2009 | Karkanias et al. | |
| 2010/0030578 A1* | 2/2010 | Siddique et al. ................. | 705/3 |
| 2010/0169801 A1* | 7/2010 | Blattner et al. ............... | 715/758 |
| 2011/0201414 A1* | 8/2011 | Barclay et al. ................. | 463/25 |

FOREIGN PATENT DOCUMENTS

EP 1 509 042 A1 2/2005

* cited by examiner

*Primary Examiner* — Kakali Chaki
*Assistant Examiner* — Kalpana Bharadwaj
(74) *Attorney, Agent, or Firm* — Steven M. Greenberg, Esq.; Carey, Rodriguez, Greenberg & O'Keefe

(57) ABSTRACT

Graphical user representations, such as emoticons or avatars, used to convey mood and emotion, can be dynamically modified and manipulated, e.g. by squeezing, rotating, distorting, coloring, etc. This enables a user to customize or tailor an existing emoticon to better reflect the user's current mood or emotion. For example, a user may insert a smiley face emoticon ☺ into a text message and then manipulate or distort the face or a component of the face (e.g. the smile) to broaden the smile into a grin, or twist the smile into an ironic smile, etc. This enables the user to personalize the emoticon rather than having to select the most appropriate emoticon from a palette of predefined emoticons. Another aspect is device hardware (e.g. dedicated or shared user interface elements or specific touchscreen gestures) for recognizing the squeezes or other gestures that are meant to modify or manipulate the emoticon.

20 Claims, 8 Drawing Sheets

DYNAMICALLY MANIPULATING AN EMOTICON OR AVATAR

CROSS-REFERENCE TO RELATED APPLICATIONS

This is the first application filed for the present technology.

TECHNICAL FIELD

The present technology relates generally to communication devices and, more particularly, to messaging applications that enable the use of emoticons or avatars.

BACKGROUND

Emoticons are small, typically simplistic, images representing a user's facial expression or current mood. For example, a smiley face such as ☺ is an emoticon used to signal that the writer of the message is smiling or happy. The emoticon ☹ is conventionally used to signal that the writer of the message is unhappy or displeased. These emoticons therefore enable the recipient of e-mail, text messages, etc. to better understand the tenor of the writer's message.

A similar concept is an avatar which is frequently used on the internet or in gaming to represent a particular user. The avatar is usually in the form of a graphical image, icon or picture which the user selects to represent himself or herself online.

Conventionally, emoticons and avatars are selected from a predetermined set or palette of prefabricated images, graphics or icons. Because the user is confined to select his or her emoticon (or avatar) from a finite number of possible emoticons (or avatars), the user cannot convey nuances in mood or feeling. A solution to this technical problem would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology provides a method, computer-readable medium and device for dynamically manipulating or modifying graphic user representations, such as emoticons or avatars used during an electronic mail conversation, instant message chat or other such dialogue. The modification or manipulation of these graphic user representations enables the user to convey nuances of mood and feeling rather than be confined to select an appropriate emoticon or avatar from a palette of predetermined emoticons or avatars.

Thus, one aspect of the present technology is a method of dynamically modifying a graphic user representation such as an emoticon or avatar. The method entails displaying the graphic user representation, receiving user input, and modifying a visual appearance of the graphic user representation to indicate a current user mood in response to the user input.

Another aspect of the present technology is a computer-readable medium comprising instructions in code which when loaded into memory and executed on a processor of a mobile device is adapted to perform the steps of the foregoing method.

Yet another aspect of the present technology is a computing device that has a processor coupled to memory for executing a communication application that enables composition and transmission of messages. The computing device includes a display for displaying a graphic user representation, such as an emoticon or avatar, and a user input device for receiving user input to dynamically manipulate a visual appearance of the graphic user representation to thereby create a modified graphic user representation that indicates a current user mood, wherein the display presents the modified emoticon or avatar.

The details and particulars of these aspects of the technology will now be described below, by way of example, with reference to the attached drawings.

Figure 1:
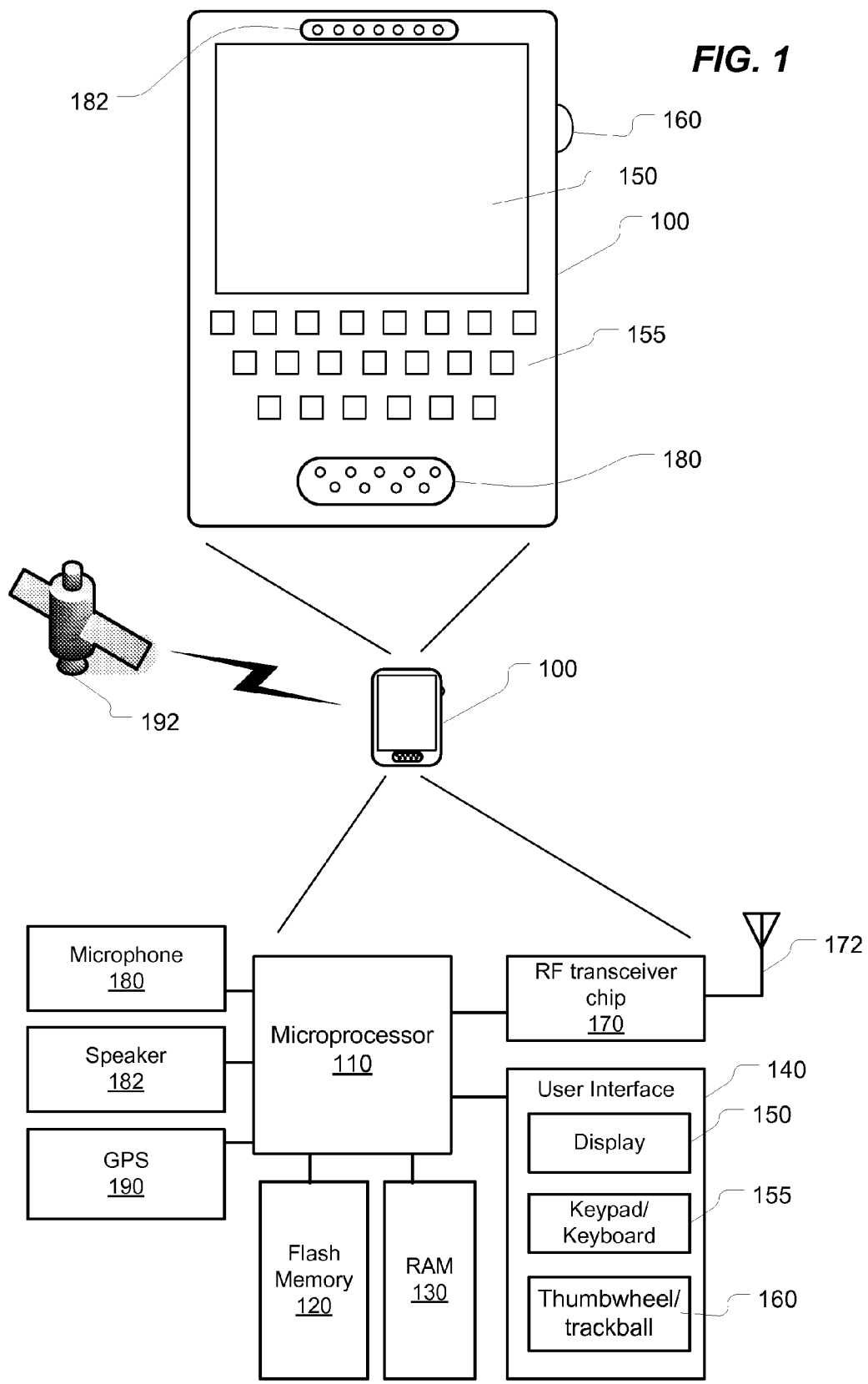
FIG. 1 is a schematic depiction of a wireless communications device as one example of a computing device upon which the present technology may be implemented.

FIG. 1 is a high-level depiction of a generic mobile device or wireless communications device 100 as one example of a computing device upon which the present technology may be implemented. As shown by way of example in FIG. 1, the novel mobile device, which is designated generally by reference numeral 100, includes a processor (or microprocessor) 110 for executing one or more applications, memory in the form of flash memory 120 and/or random access memory (RAM) 130 for storing the one or more applications and related data, and a user interface 140 with which the user interacts with the application(s). The user interface 140 includes a display screen 150 (e.g. an LCD screen or a touch-sensitive display screen). The device 100 may include a keypad or keyboard 155 and a thumbwheel, trackball or trackpad 160.

Optionally, where the mobile device is a wireless communications device, the device 100 would further include a radiofrequency (RF) transceiver chip 170 and antenna 172. Optionally, where the device is a voice-enabled wireless communications device, such as, for example, a smartphone or cell phone, the device would further include a microphone 180 and a speaker 182.

This device 100 may optionally include a GPS receiver chipset 190 or other location-determining subsystem.

For greater certainty, and for the purposes of this specification, the expression "mobile device" is meant to encompass a broad range of portable, handheld or mobile electronic devices such as smart phones, cell phones, satellite phones, PDA's or Pocket PCs, computing tablets, laptops, etc. that have communication capabilities for exchanging textual messages.

For the purposes of this specification, the expression "communication device" is meant to encompass any computing device, mobile device or electronic device that enables a user to compose, send, receive, and read textual messages such as e-mail, MMS, SMS, etc.

It bears emphasizing that while this technology may be implemented on a wireless communications device or mobile device, it may also be implemented on any wired computing device, such as a standard wired desktop computer or personal computer.

In accordance with various implementations of the present technology, the processor 110 and memory 120, 130 of this mobile device 100 may be configured to dynamically modify or manipulate a graphic user representation, such as an emoticon or avatar. The dynamic modification of the emoticon or avatar may be done manually (in response to user input on the device), or automatically (in response to keywords parsed from the text of the message that has been sent or is being composed by the user), or as a combination of both. A broad overview of the dynamic modification of emoticons or avatars will now be presented with reference to the flowcharts of FIG. 2 and FIG. 3.

Figure 2:
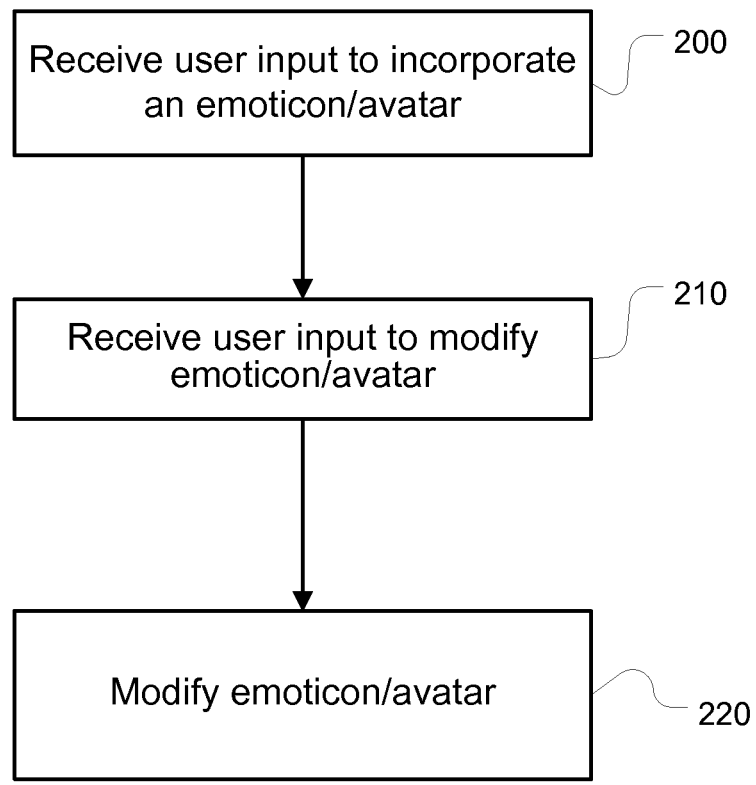
FIG. 2 is a flowchart depicting main steps of a method of dynamically manipulating an emoticon in accordance with one implementation of the present technology.

FIG. 2 is a flowchart depicting main steps of a method of dynamically manipulating an emoticon in accordance with one implementation of the present technology. In general terms, FIG. 2 shows that one process of dynamically modifying an emoticon may be triggered or initiated by user input, e.g. a command from the user that causes the device to incorporate an emoticon into a text message, e-mail, etc. The command may be, for example, a keystroke or a series of keystrokes that cause a predefined emoticon to be displayed. For example, the series of keystrokes may entail typing a colon, followed by a dash, followed by a closing parenthesis which the computer recognizes as an instruction to provide a smiley face emoticon ☺. Alternatively, the command may cause a palette of predefined emoticons to be displayed (from which the user selects the emoticon that he or she desires). Incorporation of the emoticon according to any of these aforementioned techniques is performed at step 200 in the flowchart of FIG. 2. Subsequently, at step 210, the user may signal to the device that the user wishes to dynamically manipulate or modify the emoticon that has been previously selected and displayed. This may entail receiving user input at the device in the form of a command that signals to the device that the user wishes to customize the emoticon. Subsequently, and in response to step 210, the device provides at step 220 a manipulation interface that may comprise a plurality of onscreen manipulation widgets, tools, menus, buttons, or other such means for manipulating, distorting, stretching, coloring, or decorating the emoticon. The various ways in which the emoticon may be manipulated are presented below.

Figure 3:
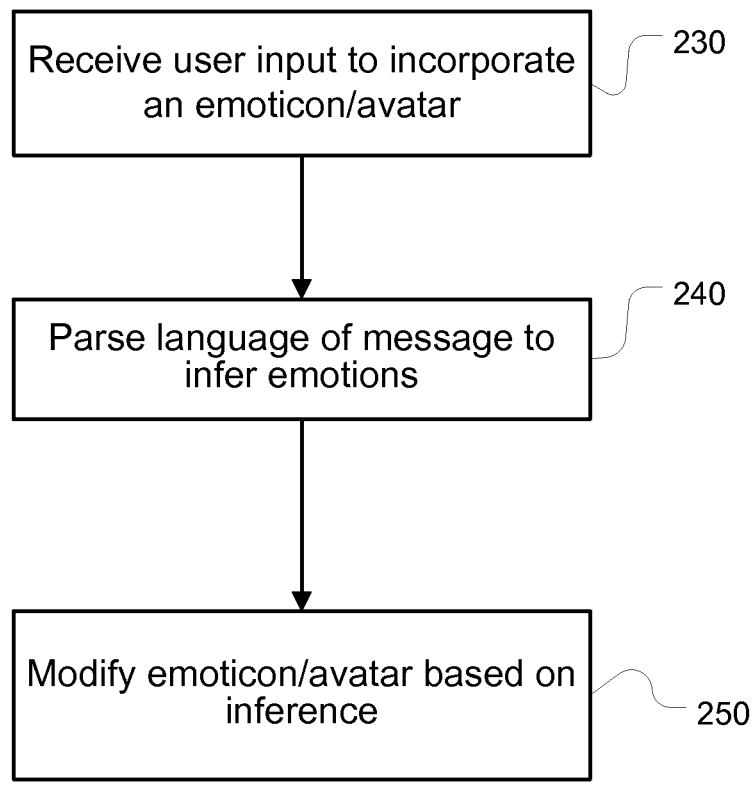
FIG. 3 is another flowchart depicting main steps of a method of automatically modifying an emoticon in accordance with another implementation of the present technology.

FIG. 3 is another flowchart depicting main steps of a method of automatically modifying an emoticon in accordance with another implementation of the present technology. Specifically, this figure depicts a process whereby an emoticon is automatically generated or modified by the device in response to inferences being drawn about the user's mood.

Inferences may be drawn about the user's mood, condition, state of mind, etc. by parsing the text of messages that the user has sent and received. For example, an artificial intelligence module operating on the device may detect certain words, phrases or expressions in the messages. Upon detecting a phrase such as, for example, "I'm having a bad day", the device may infer that the prevailing emotion or mood of the user is one of displeasure or exasperation. The device may then choose to automatically insert a suitable emoticon such as, for example, a sad face emoticon ☹. Similarly, upon detecting a reply along the lines of "Sorry to hear that", the AI module of the computing device may automatically provide an emoticon that suggests empathy. If an avatar is already being employed for the user, this avatar may be dynamically modified as the conversation progresses. Thus, as the mood of the discussion changes, as discerned or inferred by the AI module, the avatar may be dynamically modified accordingly. The degree to which these changes are modulated by previous moods may be configurable.

The mood may also be gleaned from presence information that is published by the user via a presence service. Thus, the presence information for a user may provide indicia of mood that can be imported into the text message exchange for the purposes of modifying the avatar and/or for the purposes of dynamically generating or modifying an emoticon. Conversely, mood detection of the user from his dialogue may be exported to the presence service. Thus, the present technology can interact intimately with a presence service.

Other external factors may be used to deduce or infer the user's mood or current state of mind. For example, mood may be inferred from the user's current location and/or his current activity as declared in a calendar entry, social media site, blog, personal web page or other source. Mood may also be inferred from other factors like the prevailing local weather, news or RSS feeds that may be relevant to the user or to user groups or news groups to which he subscribes. For example, if the AI module of the device detects that the current location is a vacation destination, the current weather there is sunny and warm, and the user's calendar shows that the user is indeed on vacation, then the AI module may infer from these circumstances that the user is likely to be in a good mood. If on the other hand, for example, the user's favourite sports team has lost, the weather is rainy, and the user is scheduled to be a meeting, then the AI module may infer that the mood of the user is likely to be poor.

From these textual or circumstantial inferences, the device may automatically modify the avatar or emoticon without direct manipulation by the user. This is represented by the flowchart of FIG. 3. As was the case with the flowchart of FIG. 2, the process may begin (at step 230) when the user instructs the device to incorporate an emoticon into the message. As noted above, this may involve a command or series of keystrokes to invoke a particular emoticon or it may involve selecting one emoticon from a palette of predefined emoticons. Subsequently, at step 240, the language of the messages sent, received or actively being composed is parsed to infer emotions or mood. At step 250, the device automatically modifies the emoticon (or avatar) based on the inference as to emotion or mood.

Automatic modification of emoticons may be activated, deactivated and reactivated by configuring the device settings in an options page. Automatic modification of emoticons may be configured to operate on only the emoticon that has been last selected by the user, on the most recent set of emoticons selected by the user, or on the entire of palette of emoticons. Again, the extent of this automatic modification may be reconfigurable.

In a variant of the two main methods presented in FIG. 2 and FIG. 3, the device may automatically modify the emoticon and request validation of this automatic modification by the user. The user may, for example, touch the screen to validate or annul the proposed modification.

To summarize, the device may firstly be configured to generate a new emoticon or avatar. Generation of a new emoticon or avatar may be manual or automatic, i.e. it may be based on user input, or based on textual or circumstantial inferences. Secondly, the device may be configured to dynamically modify an existing emoticon or avatar. Modification may be either manual or automatic. Manual modification involves user input that triggers the display of onscreen manipulation tools which the user then employs to manipulate, distort or otherwise customize the emoticon or avatar. Automatic modification of an existing emoticon or avatar entails dynamically varying the appearance of the existing emoticon or avatar based on textual or circumstantial inferences drawn by the AI module of the device.

The subsequent figures in this application depict various specific implementations of this novel technology.

Figure 4:
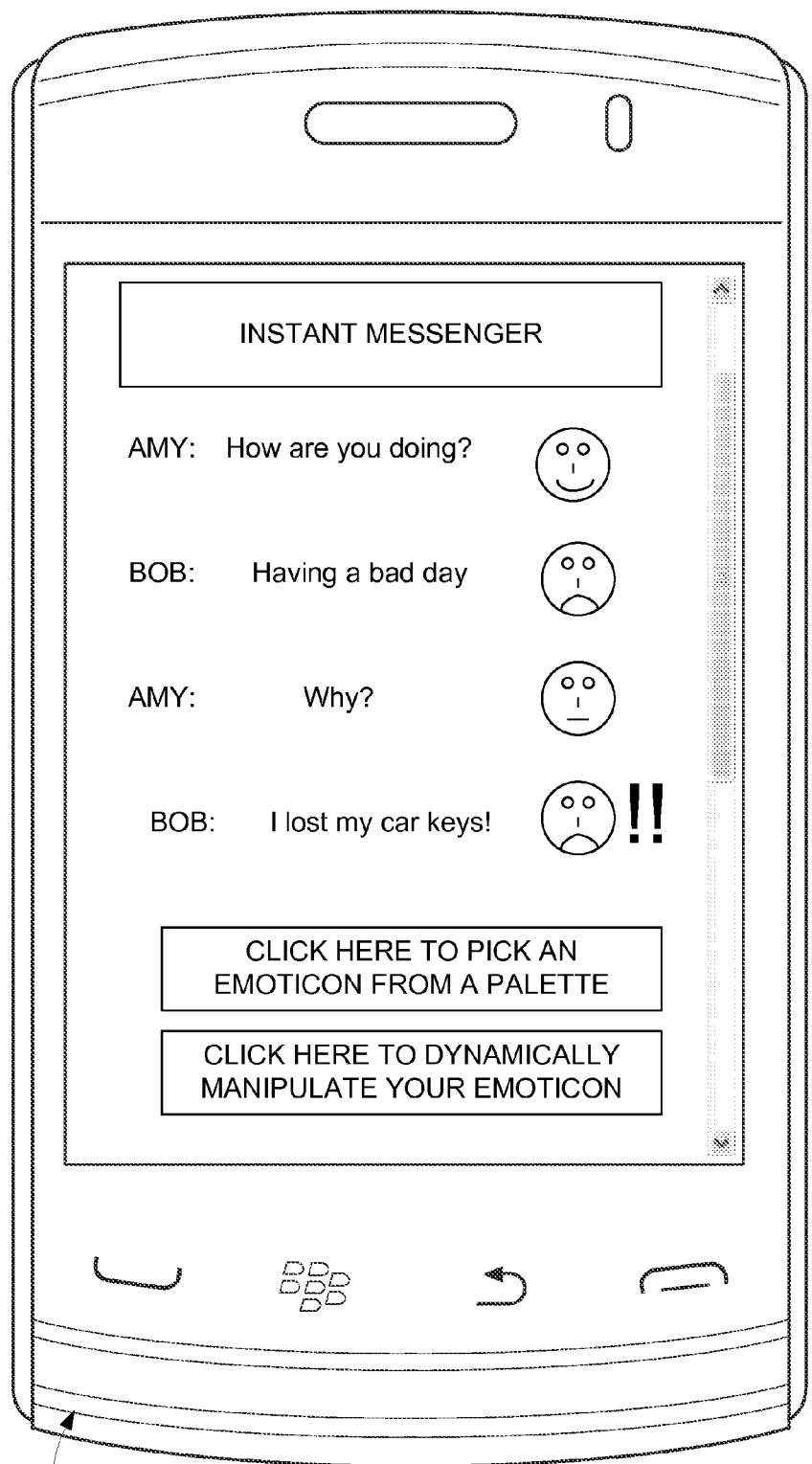
FIG. 4 depicts a touch-screen mobile device executing an instant messaging application that enables the user to utilize emoticons and to dynamically manipulate the emoticons.

FIG. 4 depicts a touch-screen mobile device executing an instant messaging (IM) application. The display shows an IM conversation between Amy and Bob. Each user has chosen to incorporate emoticons after their respective messages. As shown by way of example in the particular implementation presented in FIG. 4, the emoticons are simple smiley faces, although it should be appreciated that visually more intricate avatars may be employed. The user interface of the device presented by way of example in this figure shows that the device enables the user to either (i) select an emoticon from a palette by clicking a user interface element on the touch screen or (ii) dynamically manipulate the selected emoticon by clicking a different user interface element at the bottom of the touch screen. Where the dynamic modification user interface element is touched, the device displays the emoticon and a tool set for onscreen manipulation. Any other dedicated key, button or user interface element may be provided for this purpose (i.e. triggering the dynamic modification tool set).

Figure 5:
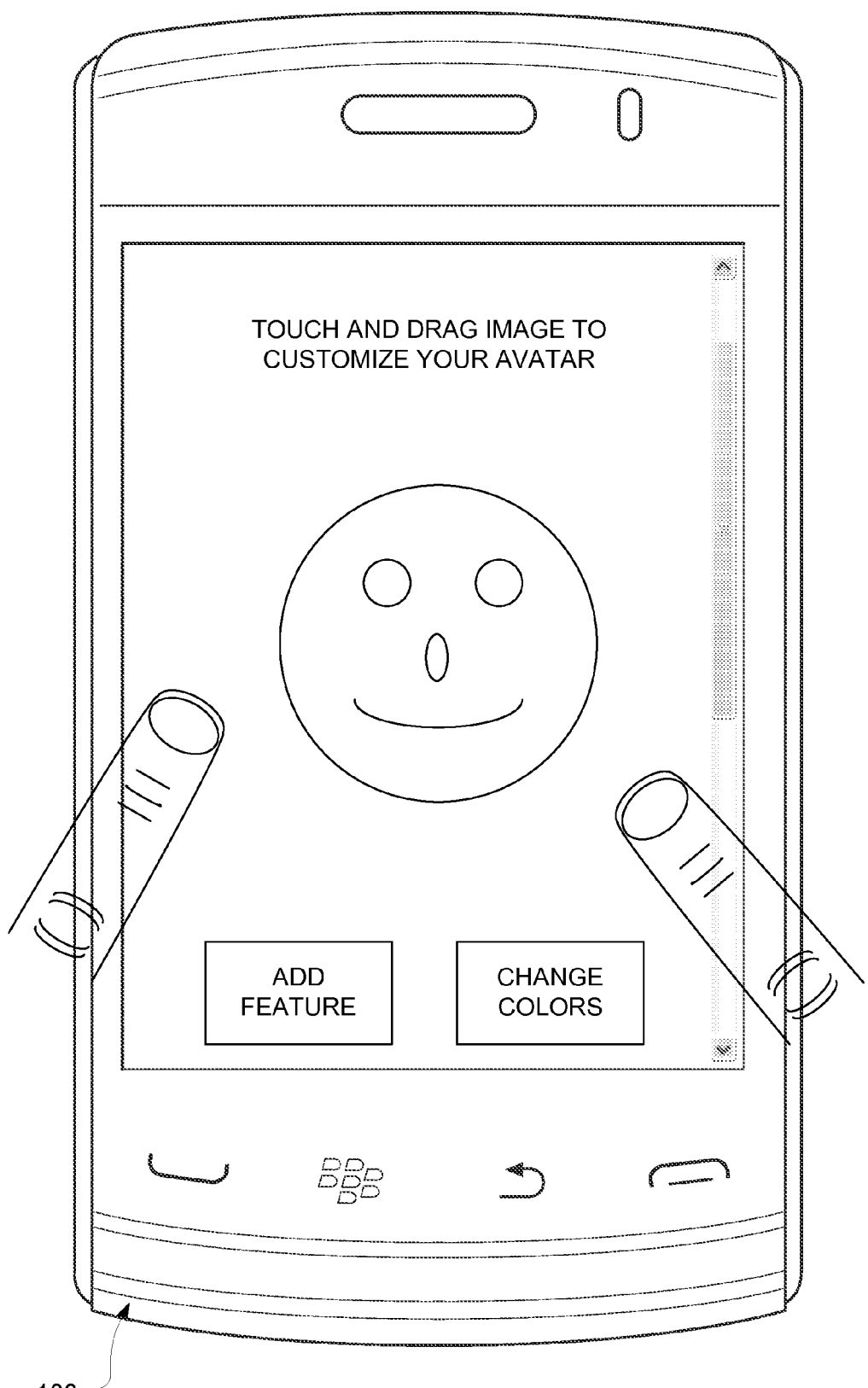
FIG. 5 depicts an enlarged emoticon for dynamic touch-screen manipulation in accordance with one implementation of this technology.

FIG. 5 depicts an enlarged emoticon for dynamic touch-screen manipulation in accordance with one implementation of this technology. As depicted by way of example in this figure, the touch screen device displays the avatar or emoticon in an enlarged view. The user may distort, stretch, squeeze, rotate or color the emoticon to thereby customize it to the specific mood of the user. This enables the user to convey nuanced moods and feelings rather than being confined to predefined emoticons. The user interface may also provide options to add a feature to the emoticon (e.g. add hair, add a hat, add a moustache, etc.) or to changes other visual characteristics like color, size, etc. Still further options (not shown) may be provide to vary the specific facial features (e.g. the user may vary the appearance of the emoticon's eyes, ears, nose, mouth, etc.)

Figure 6:
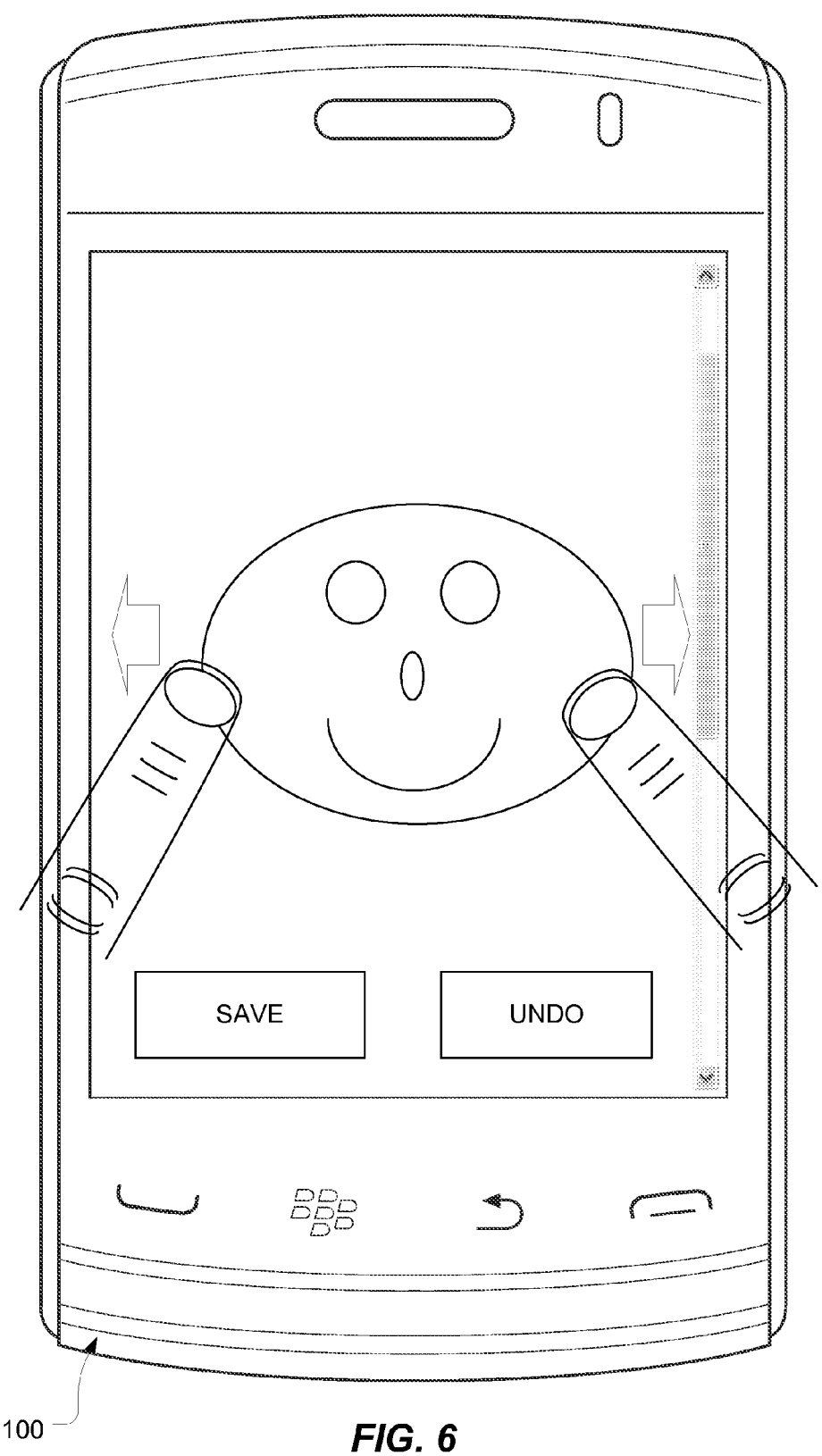
FIG. 6 depicts how the emoticon of FIG. 5 may be manually distorted, stretched or otherwise manipulated using touch input to customize the appearance of the emoticon.

FIG. 6 depicts how the emoticon of FIG. 5 may be manually distorted, stretched or otherwise manipulated using touch input to customize the appearance of the emoticon. Onscreen manipulation tools (e.g. arrows to show the selected direction of stretching or squeezing, curved arrows to show the direction of rotation, or other such symbols) may be displayed to facilitate the user's task of distorting, stretching, squeezing or otherwise manipulating the emoticon. Various buttons or keys may be displayed for various functions, e.g. save, undo, etc.

Figure 7:
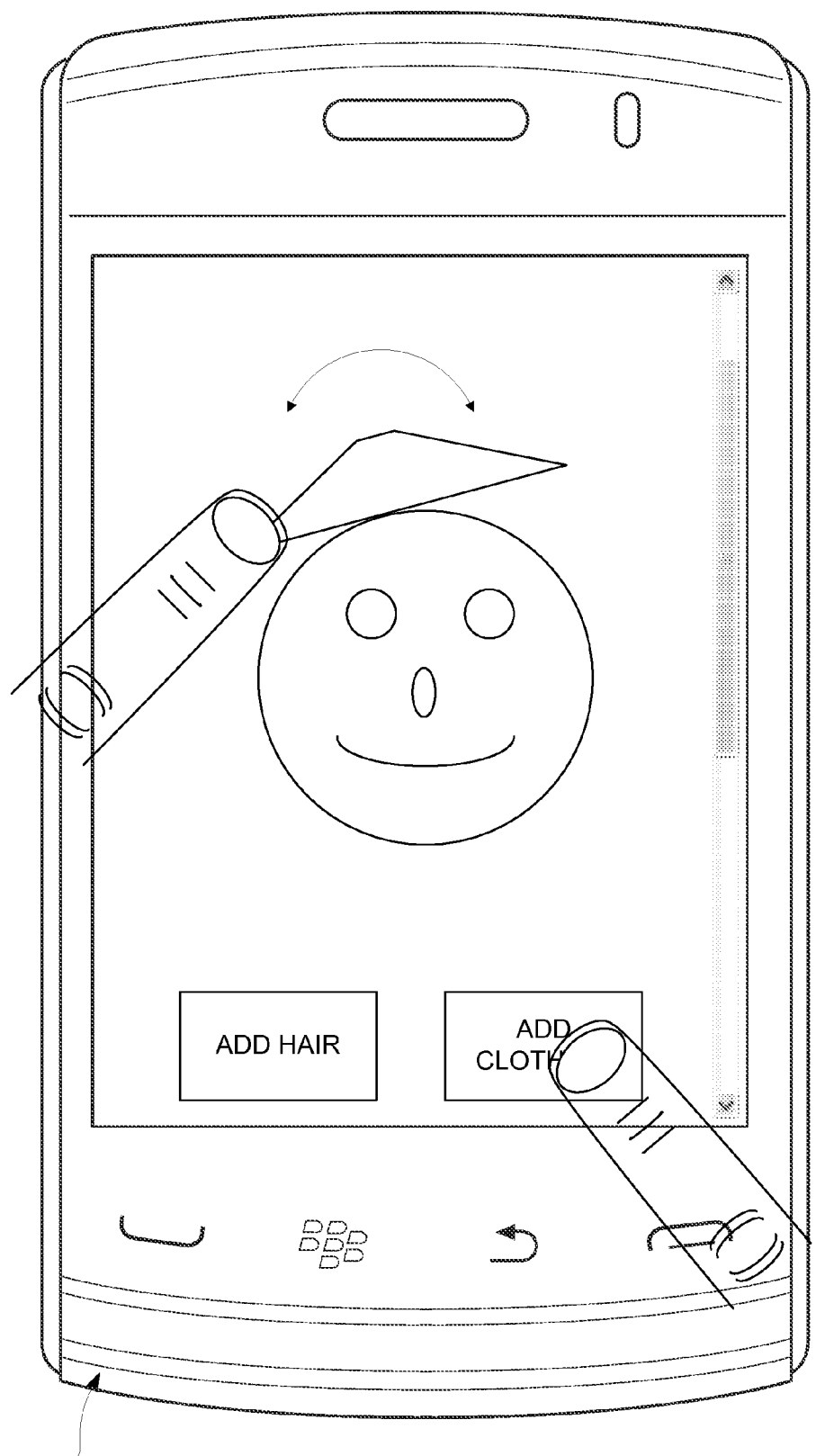
FIG. 7 depicts how the emoticon may be customized by the addition of a hat (or other artefact or decorative object) and how that object may itself be manipulated to further customize the appearance of the emoticon.

FIG. 7 depicts how the emoticon may be customized by the addition of visual features such as the addition of hair or clothing such as, for example, a hat. The visual feature may be selected from a palette of predefined artefacts or objects such as, for example, a flag, sword, sports equipment, food or other decorative object. This figure also shows how that object (in this case, the hat) may itself be manipulated to further customize the appearance of the emoticon.

Figure 8:
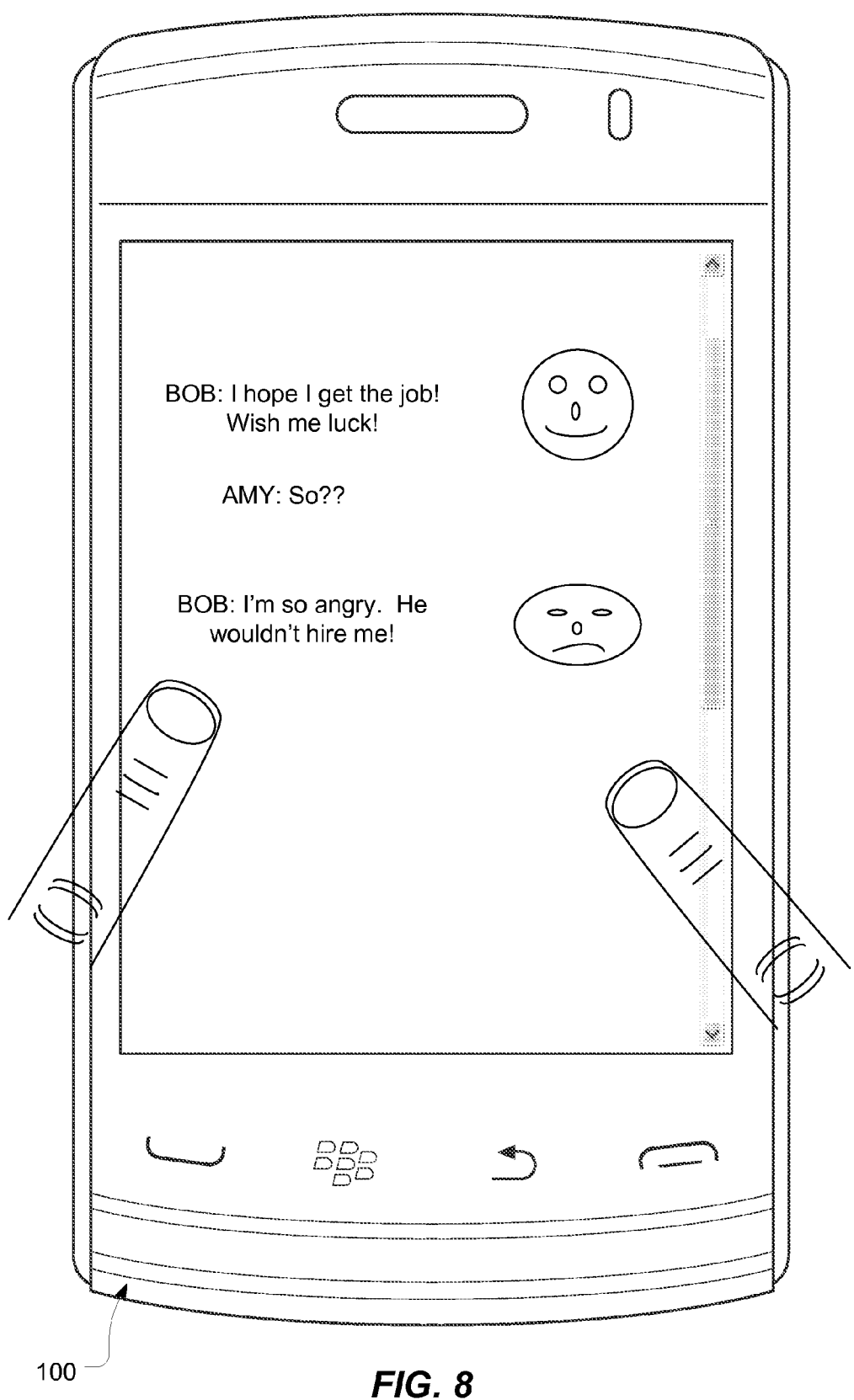
FIG. 8 depicts the automatic generation or modification of an emoticon by parsing the text of an instant message to search for words from which the user's mood may be inferred.

FIG. 8 depicts the automatic generation or modification of an emoticon by parsing the text of an instant message to search for words from which the user's mood may be inferred. In this example, an IM conversation between Bob and Amy is parsed by the AI module of the device. The first message contains the word "hope" which signifies a positive outlook. A smiley face emoticon is automatically incorporated for this message. The final message contains the phrase "I'm so angry" which the AI module recognizes as implying anger. Accordingly, the emoticon generated is one showing a face of displeasure.

In another implementation, instead of inserting emoticons after each message, a single avatar can be displayed representing the user's mood. This single avatar, which may be displayed anywhere onscreen, is dynamically modified either manually (by user input) or automatically (based on textual or circumstantial inferences).

The foregoing examples show how emoticons and avatars can be manipulated on a touch screen device. Specific touch screen gestures may be programmed so as to be recognizable by the AI module of the device to mean that a certain emoticon distortion or manipulation is desired.

The foregoing method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

It should be appreciated that this technology may be implemented on any other (non-touch-sensitive mobile device, communication device or computing device). In one implementation, a user input device may be provided with dedicated keys (hot keys) for manipulating the emoticon or avatar. The dedicated keys may be haptic, force-sensitive or force-feedback keys that distort the emoticon or avatar in proportion to the force applied to the key(s). For example, the device may have force-sensitive keys on opposite sides of the device. The user squeezes the keys to visually squeeze (distort) the emoticon.

This new technology has been described in terms of specific implementations and configurations which are intended to be exemplary only. Persons of ordinary skill in the art will, having read this disclosure, readily appreciate that many obvious variations, refinements and modifications may be made without departing from the inventive concept(s) disclosed herein. The scope of the exclusive right sought by the Applicant(s) is therefore intended to be limited solely by the appended claims.

The invention claimed is:

1. A method of dynamically modifying a graphic user representation displayed on a wireless communication device, the method comprising:
   composing a textual electronic message in a message user interface in response to user input provided by an end user;
   inserting into the textual electronic message a graphic user representation;
   detecting a change in context for the electronic message; and
   modifying a visual appearance of the graphic user representation already inserted in the electronic message to indicate the change in context for the electronic message.

2. The method as claimed in claim 1, wherein the graphic user representation is one of an emoticon and an avatar.

3. The method as claimed in claim 2, wherein the graphic user representation is an emoticon manually incorporated into the electronic message in response to receiving a user input directing incorporation of the emoticon into the electronic message.

4. The method as claimed in claim 2, wherein the graphic user representation is an emoticon automatically incorporated into the electronic message in response to one or more inferences of an emotional state of the end user drawn by an artificial intelligence module coupled to the message user interface.

5. The method as claimed in claim 4 wherein the one or more inferences are textual inferences derived from parsing the message.

6. The method as claimed in claim 4 wherein the one or more inferences are circumstantial inferences based upon the change in context.

7. The method as claimed in claim 6 wherein the circumstantial inferences are based on at least one of current location, current calendar entry, current weather, and currents news.

8. The method as claimed in claim 2 wherein modifying the visual appearance of the graphic user representation comprises at least one of distorting, stretching, squeezing, rotating and coloring.

9. A non-transitory computer-readable storage medium storing instructions in code which when loaded into memory and executed on a processor of a computing device is adapted to:
   compose a textual electronic message in a message user interface displayed by a computing device in response to user input provided by an end user;
   insert into the textual electronic message a graphic user representation;
   detect a change in context for the electronic message; and
   modify a visual appearance of the graphic user representation already inserted in the electronic message to indicate the change in context for the electronic message.

10. The computer-readable medium as claimed in claim 9 comprising code that causes the device to manually incorporate the graphic user representation into the electronic message in response to a user input.

11. The computer-readable medium as claimed in claim 9 comprising code that causes the device to automatically incorporate the graphic user representation into the electronic message in response to one or more inferences drawn by an artificial intelligence module coupled to the message user interface.

12. The computer-readable medium as claimed in claim 9 comprising code for modifying the visual appearance of the graphic user representation by at least one of distorting, stretching, squeezing, rotating and coloring.

13. A computing device comprising:
   a memory;
   a processor coupled to the memory, the processor operable to execute a communication application that enables composition and transmission of messages;
   a display operable to display a graphic user representation;
   a message user interface in which a textual electronic message is composed in response to user input provided by an end user; and
   a user input device operable to insert into the textual electronic message the graphical user representation, to detect a change in context for the electronic message and to modify the graphic user representation already inserted into the textual electronic message to indicate the change in context for the electronic message, wherein the display presents the modified graphic user representation.

14. The computing device as claimed in claim 13, wherein the graphic user representation is one of an emoticon and an avatar.

15. The computing device as claimed in claim 14, wherein the user input device is operable to receive a command to manually incorporate the graphic user representation into a message.

16. The computing device as claimed in claim 14, further comprising an artificial intelligence module executable by the processor and memory to automatically incorporate the graphic user representation into a message based on one or more inferences.

17. The computing device as claimed in claim 16 wherein the inferences are textual inferences drawn from parsing the message.

18. The computing device as claimed in claim 16 wherein the inferences are circumstantial inferences.

19. The computing device as claimed in claim 14 wherein the user input device comprises at least one of a haptic key, a force-sensitive key and a force-feedback key to manipulate graphic user representation.

20. The computing device as claimed in claim 14 wherein the user input device comprises a touch screen to interpret recognizable gestures to manipulate the graphical user representation.

* * * * *